United States Patent Office 3,206,663
Patented Sept. 14, 1965

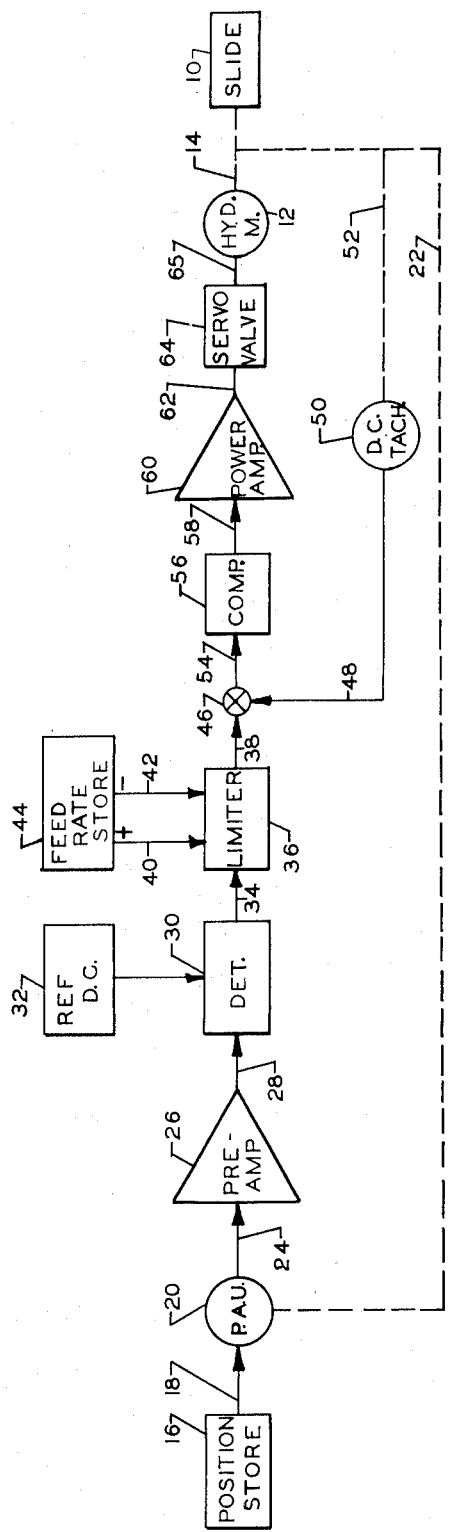
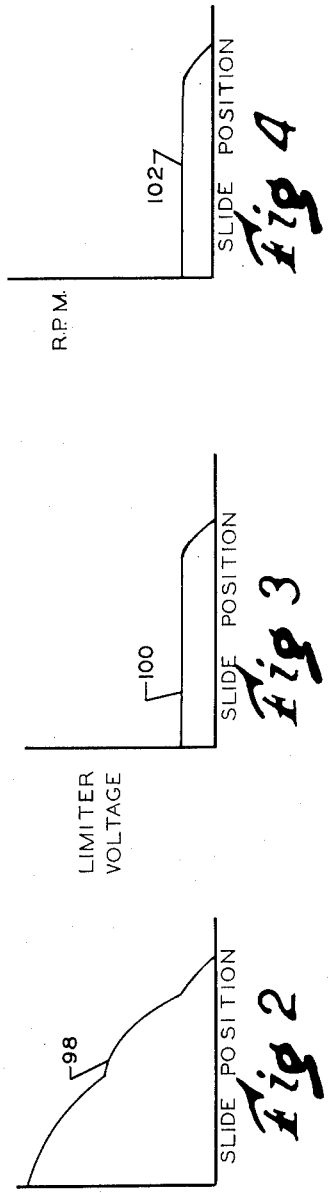
INVENTORS
NORMAN D. NEAL
HERBERT E. MERRITT
BY
ATTORNEYS

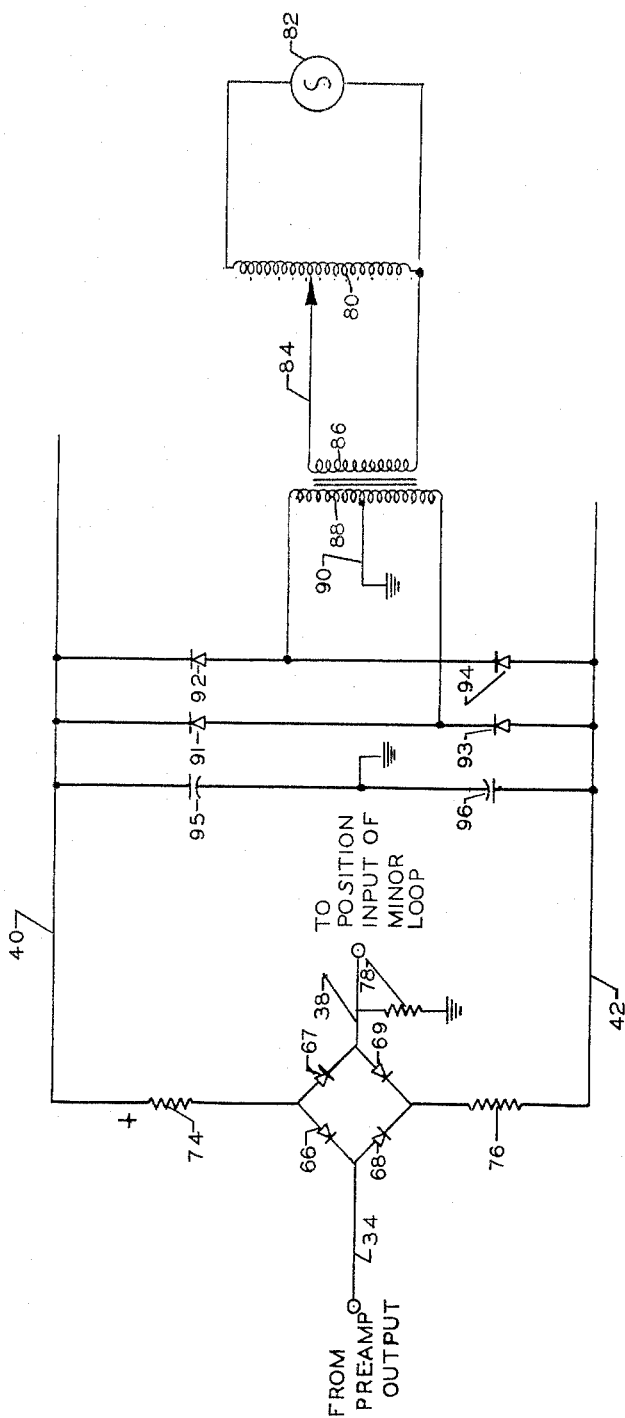

3,206,663
MACHINE TOOL POSITION CONTROL SERVO-
MECHANISM WITH POSITIONING RATE
CONTROL
Norman D. Neal and Herbert E. Merritt, Cincinnati,
Ohio, assignors to The Cincinnati Milling Machine
Co., Cincinnati, Ohio, a corporation of Ohio
Filed Nov. 29, 1962, Ser. No. 240,952
1 Claim. (Cl. 318—28)

The present invention relates to servomechanisms and more particularly to a unique closed loop servo having an error signal limiting circuit to restrict the rate of operation of the controlled motor in the loop.

In an automatic machine tool having a point to point positioning control mechanism, it is often desirable to be able to machine straight lines between points on a workpiece as well as to perform local operations such as hole drilling and counterboring. To machine straight line surfaces in a uniform and acceptable manner, the rate of movement between programmed points must be accurately controlled in order to produce acceptable surface finishes and to prevent cutting tool overload. The magnitude of the error signal generated in a servomechanism to effect movement of a controlled element from one position to another does not remain uniform as the element is moved from one location to another but rather is at a maximum level when the element is at the greatest distance from the desired location or final position and decreases as the element approaches that final position. Therefore, it is difficult to use this signal to produce a smooth and uniform movement of a controlled element between two points.

It is, therefore, an object of this invention to provide a servomechanism that will control the rate of operation of the motor therein accurately in accordance with a preset rate to cause a controlled element to move at a practically uniform rate from point to point.

It is a further object of this invention to provide a closed loop servo in which the level of the error signal generated in the loop can be limited practically absolutely to a preset level, thereby producing a uniform rate of movement of the controlled element over a long range of movement between two predetermined points.

Yet another object of this invention is to provide a servomechanism in which the level of error signal can be limited without the use of mechanical switching means to maintain the error signal output in a relatively constant condition.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

An error signal is produced in the position analog unit of a closed loop servo by comparison of an input command with a feed-back signal that indicates the instantaneous position of the controlled element. In accordance with this invention, the error signal is coupled through a switchless limiting circuit between the position analog unit and the power amplifier that drives the mechanical transducer of the system. The limiter circuit produces an absolute limitation of the input signal to a preset maximum amplitude level on its output side. The level of limitation is determined by the setting of a feed rate information store connected to the limiter circuit. Thus, by holding the error signal to a set maximum amplitude level at the input side to the power amplifier, the drive furnished by the power amplifier is accordingly limited and a rate of movement of the controlled element will be defined.

A clear understanding of the invention can be obtained from the following detailed description in which reference is made to the attached drawings wherein:

FIG. 1 is a block diagram of a servomechanism.

FIGS. 2, 3, and 4 are graphical illustrations of variables within the servo loop.

FIG. 5 is a schematic showing of a bridge limiter circuit and a direct current bias network connected thereacross.

The block diagram of FIG. 1 shows a servomechanism the function of which is to produce point to point movement along one axis of a machine tool slide 10 which may be for example, the table of an automatically controlled drilling machine. The slide 10 is positioned by a hydraulic motor 12 acting through gearing 14. The positions to which the slide 10 is moved are defined by alternating current potentials set up in a position store 16 which may be for example a voltage divider network from which sine and cosine alternating current voltages can be selected. The sine and cosine voltages are connected via a cable 18 to a multi-speed position analog unit 20. The unit 20 employs resolvers each having a pair of stator windings bearing a quadrature relationship. By the connection of the sine and cosine voltages from the store 16 to the stator windings of the resolvers in unit 20, an angular null position is defined for the rotor winding of each, that is, for each particular combination of a sine and a cosine voltage coupled to the stators of a resolver in the unit 20, there is one angular position of the rotor in the unit 20 at which the voltage induced therein will be null or zero. The rotors of the position analog unit 20 are connected by gearing 22 for rotation by the motor 12 as it is operated to move the slide 10. The direction of drive from the motor 12 through the gearing 22 is such that the rotor therein is driven toward its null position since the potential on the rotor is tapped off via a conductor 24 to produce an error signal the presence of which will cause the operation of the motor 12. The conductor 24 is connected to a preamplifier unit 26 where the alternating current error signal is amplified. The amplified error signal is then passed from the preamplifier 26 through a conductor 28 and into a detector circuit 30 to which an alternating current reference voltage source 32 is connected. The detector circuit produces a direct current error signal output at the conductor 34 which is proportional to the alternating current input on the conductor 28 and has a polarity determined by the phase of the input signal on conductor 28. The conductor 34 connects with a limiter circuit 36 which couples the error signal to an output lead 38. The amplitude of the error signal on the lead 38 is restricted to a preset amplitude by the limiter circuit 36, however. The amplitude of the error signal on the lead 38 depends upon the direct current potentials on the conductors 40 and 42 which are connected across the limiter circuit 36 to bias it and define the upper limit of the error signal output on the lead 38. The potentials on the conductors 40 and 42 is dependent upon the adjustment of a feed rate store 44 which develops the potentials impressed thereon. The lead 38 connects the limited direct current error signal to a summing circuit 46 to which a direct current stabilizing potential is connected by a lead 48 from a tachometer 50. The tachometer 50 is driven by gearing 52 connected to the motor 12 to produce a direct current potential on the lead 48 in accordance with the rate of operation of the motor 12. That potential is algebraically added to the limited error signal on lead 38 to stabilize the operation of the loop in a well known manner which in effect tends to cause a damping of oscillatory operation of the system. The limited error signal as modified in the summing circuit 46 and is applied through the conductor 54 to a compensation network 56 such as a resistance-capacitance network, or an integrator circuit which may be comprised of a direct current amplifier, either of which is well known in the servomechanism art. The purpose of the compensation network 56 is to raise the low frequency response characteristic of the minor loop which includes the tachometer 50 that is affected in great part by the motor load frequency. The limited and modified error signal is then coupled from the compensation network 56 through a conductor 58 to a power amplifier 60 which produces an output in the cable 62 that is proportional to the signal on conductor 58. The cable 62 transmits the amplified output to a servo-valve 64 which functions as a transducer to convert the electrical output into a mechanical action that controls the volume and direction of flow of fluid through piping represented at 65 to the motor 12 which moves the slide 10 as well as drives the tachometer 50 and rotor of the position analog unit 20.

The rate at which the motor 12 is operated depends upon the strength of the signal applied to the servo valve 64 which in turn is controlled by the amplitude of the signal from the limiter circuit 36. The direction of operation of the motor 12 depends upon the polarity of the signal applied to the servovalve 64 and the maximum amplitude is symmetrical in both polarities about the zero reference voltage. The limiter circuit 36 is shown in detail in FIG. 5. The input to the limiter 36 from the detector circuit 30 is transmitted by the conductor 34 and the output from the limiter 36 is coupled through the output lead 38. The limiter circuit 36 is comprised of a bridge circuit including the diodes 66, 67, 68, 69, the level of the output of which is determined by the direct current voltage bias applied across it on the conductors 40, 42 from the feed rate store 44 and the value of the resistances 74, 76. The conductor 40 has a positive potential applied thereon while the conductor 42 has a negative voltage impressed thereon. With no input signal on the conductor 34, the diodes 66 through 69 are all biased to conduction by the potentials on the lines 40 and 42 and the resulting current flow through the resistances 74 and 76. With the diodes 66 through 69 conducting, their resistance is practically zero and the potential at the input conductor 34 must be the same as the potential at the output lead 38. Also, since the diodes 66 through 69 are conducting, they are bilateral and a potential now impressed on the input lead 34 will cause a component of current flow through each of the diodes 66 through 69 until the current component thus resulting in certain of the diodes reaches a level at which it equals the current from the bias potentials. If the potential at conductor 34 is going positive, the current component resulting therefrom will oppose the current in the diodes 66 and 69. At a determinable level of potential at conductor 34, the signal current resulting therefrom will equal the bias current and being opposite thereto, the signal current will shut off diode 66. At some higher value of the signal on conductor 34, the signal current component will equal the bias current in the diode 69 and being opposite in direction will shut off that diode. Now the diodes 66 and 69 will both remain shut off for all higher values of the signal on the input lead 34 and the output lead 38 is isolated therefrom. The potential on the output lead 38 is now solely dependent upon the current from the line 40 through the resistance 74, the lead 38, and then to ground through a resistance 78. This current will be practically constant and therefore the potential on the output lead 38 will be clamped at a corresponding value. Thus it can be seen that the potential on the output lead 38 corresponds to that on the input lead 34 until the input potential reaches a predetermined value at which time the output lead 38 will be limited to a predetermined positive value and prevented from a further increase in potential. If the potential of the input lead 34 goes in the negative direction the diodes 68 and 67 will be sequentially shut off in the same manner to isolate the output lead 38 from the input lead 34 and the potential of the output lead 38 will be dependent solely upon the current from ground through the resistor 78, diode 69, and the resistance 76 to the bias lead 42. The effect in this condition is also to limit the potential on the output lead 38 to a predetermined maximum negative value. The operation of the diode bridge circuit shown is described in greater detail in an article by Medkeff and Parent at pages 913–916, vol. 70, of the Transactions of the American Institute of Electrical Engineers and entitled, "A Diode Bridge Limiter for Use With Electrical Analog Computers."

Adjustment of the potential on the leads 40, 42 will change the maximum positive and negative values which can be coupled through the output lead 38. An autotransformer 80 is connected across a source of alternating potential 82 and a selected potential is tapped therefrom by the wiper 84. The potential on the wiper 84 is developed across a transformer primary 86 which induces an alternating potential in the secondary 88, the center of which is grounded by lead 90. The diodes 91, 92, 93, 94 in the output circuit from the secondary 88 perform full wave rectification of the induced alternating potential and the capacitors 95, 96 smooth the ripple to provide a constant level of direct current potential on the bias leads 40, 42. This is the circuit of the feed rate store 44 and the adjustment of its output represented by the potential on the leads 40, 42 is made by selected positioning of the wiper 84.

The effect of the limiter circuit 36 is shown graphically in FIGS. 2, 3, and 4. In FIG. 2, the curve 98 represents the error voltage of the position analog unit 20 plotted against the instantaneous position of the slide 10 in a system where the position analog unit 20 is a multi-speed control system using coarse, medium and fine position analog unit components in a well known manner. At the start of the positioning operation the error signal is large and as the operation progresses, the error voltage drops off until it is zero at which time the slide 10 is in its selected new position. The error voltage produces an output from the limiter circuit 36. This limiter output voltage is plotted against instantaneous position of the slide 10 in FIG. 3 and is indicated by the curve 100. This shows that an error signal as in FIG. 2 will produce a limited output 100 which is constant over a wide range of slide position and drops off only as the slide 10 approaches close to the new position. FIG. 4 is a plot of speed in revolutions per minute of the motor 12 against the instantaneous position of the slide 10. As can be seen, the curve 102 which shows the motor revolutions in the positioning operation is similar to the curve 100 in FIG. 3 and indicates that the motor 12 is operated at a uniform rate over a great portion of the positioning operation until the slide 10 closely approaches the selected new position.

What is claimed is:

A servomechanism comprising:

(a) a controlled member movable through a range of positions, (b) means to produce an error signal having an amplitude proportional to the difference between the instantaneous position of said controlled member and a selected final position thereof and having a polarity corresponding to the direction of said selected final position from the instantaneous position, (c) a reversibly operable motor connected to said controlled member for movement thereof, (d) means responsive to said error signal to operate said motor in a direction to move said controlled member toward the selected final position whereby said error signal is reduced, the rate of operation of said motor corresponding to the level of error signal coupled to said motor operating means, (e) a diode bridge limiter continuously connected between said error signal producing means and said motor operating means and operable to limit the maximum level in either polarity of said error signal coupled therethrough to said motor operating means, (f) a direct current bias circuit connected across said bridge limiter, said bias circuit controlling the maximum level of error signal coupled through said bridge limiter, and (g) a single means selectively to adjust the potential output of said bias circuit whereby the maximum rate of operation of said motor in one and the other directions is adjusted equally and simultaneously.

References Cited by the Examiner

UNITED STATES PATENTS

| | | | |
|---|---|---|---|
| 2,866,933 | 12/58 | Bond et al. | 318—489 X |
| 3,015,458 | 1/62 | Marx | 318—489 X |
| 3,051,416 | 8/62 | Rotier | 318—489 X |

JOHN F. COUCH, *Primary Examiner.*